Feb. 7, 1939.   J. D. McCLURE   2,146,508
CALIPER
Filed Jan. 15, 1938   2 Sheets-Sheet 1

INVENTOR.
Jay D. McClure
BY Walter E. Schirmer
ATTORNEY.

Feb. 7, 1939. J. D. McCLURE 2,146,508
CALIPER
Filed Jan. 15, 1938 2 Sheets-Sheet 2

INVENTOR.
Jay D. McClure
BY Walter E. Schirmer
ATTORNEY.

Patented Feb. 7, 1939

2,146,508

UNITED STATES PATENT OFFICE 2,146,508

CALIPER

Jay D. McClure, Lakeville, Ind.

Application January 15, 1938, Serial No. 185,083

17 Claims. (Cl. 33—178)

This invention relates to calipers, and more particularly is directed to a caliper for obtaining the dimensions of cylindrical bores without requiring the removal of the boring bar or rod.

In grinding or cutting cylindrical bores by means of a boring bar provided with a cutter, it has been found extremely difficult to ascertain with any degree of accuracy the diameter of the bore. In many cases it is necessary to remove the boring bar for this purpose, resulting in possible misalinement when it is again inserted and requiring considerable time and labor.

Another disadvantage of prior practices with which I am familiar is the inability to obtain a measurement sufficiently within the end of the bore to eliminate inaccuracies caused by runout and the like.

The present invention contemplates, in its preferred embodiment, a caliper or similar device which can be readily manipulated to obtain an accurate measurement of the diameter of such bores without requiring the removal of the boring bar, and which is at all times accurately alined with the axis of the bore so as to obtain a true diametrical indication.

Another feature of the present invention resides in a caliper of this type which is supported on the boring bar during use, and thus accurately held in centered position during the measuring operation.

Still another feature of the present invention is the provision of a pair of pivotally mounted caliper arms normally urged outwardly away from each other and adapted to be frictionally clamped in position while inserted into a bore to be measured.

One of the primary objects of the present invention is a device of this type in which the tip ends of the caliper arms project axially from the device to an extent sufficient to penetrate into the bore beyond the point at which runout commences, thereby providing an extremely accurate measurement.

Another of the objects of the present invention is to provide a caliper which can be operated by the use of only one hand, thereby rendering it extremely simple in operation.

Still another advantage secured by the present invention is the simplified design of the means for releasing the arms after positioning thereof in the bore, whereby they are resiliently urged into positive engagement with diametrically opposed points on the surface of the bore, thus insuring an accurate measurement of the diameter of the bore.

Other objects and advantages of the present invention will appear more fully from the following detailed description which taken in conjunction with the accompanying drawings will disclose to those skilled in the art the particular construction and operation of a preferred form of the present invention.

Referring now in detail to the form of invention shown in Figures 1 to 4, I have provided a caliper indicated generally at 5 having a knurled peripheral portion 6 facilitating gripping of the member so that it may be readily placed upon the cutter bar 7. The cutter bar 7 extends through a bore 8 in a work piece 9 and the caliper is employed in this particular disclosure for measuring the internal diameter of the bore 8 with the cutter bar in position therein.

Figure 1:
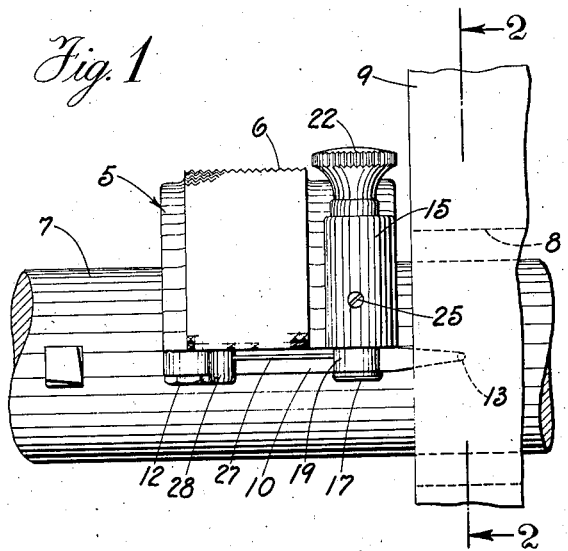
Figure 1 is a side elevational view of the calipers mounted on a cutter bar and in operative position for measuring.
Figure 2:
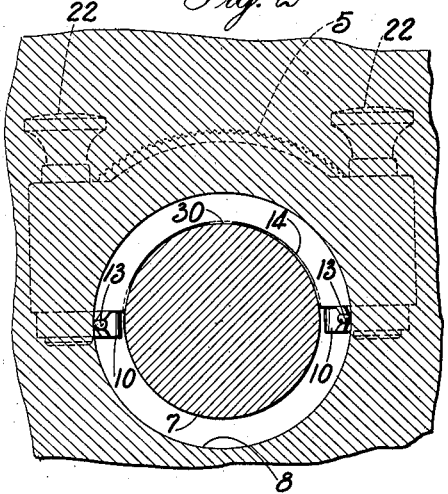
Figure 2 is a sectional view taken on the line 2—2 of Figure 1.
Figure 3:
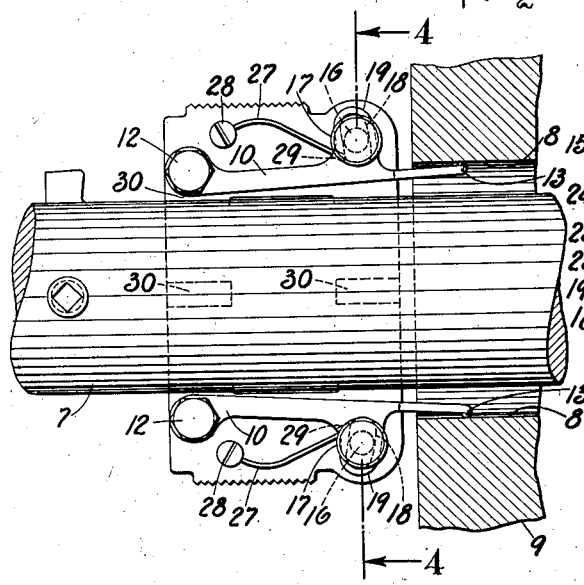
Figure 3 is a bottom plan view of the calipers shown in Figure 1 with a portion of the work piece shown in section.
Figure 4:
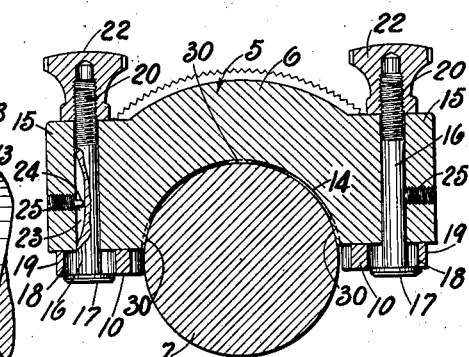
Figure 4 is a sectional view taken substantially on line 4—4 of Figure 3.
Figure 5:
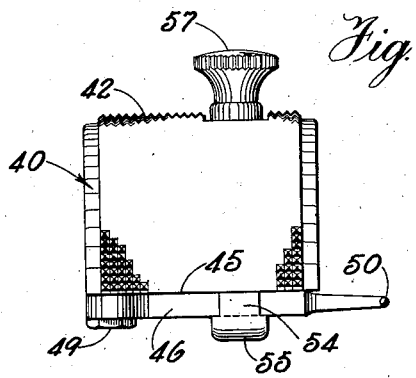
Figure 5 is a side elevation view of a modified form of calipers.
Figure 6:
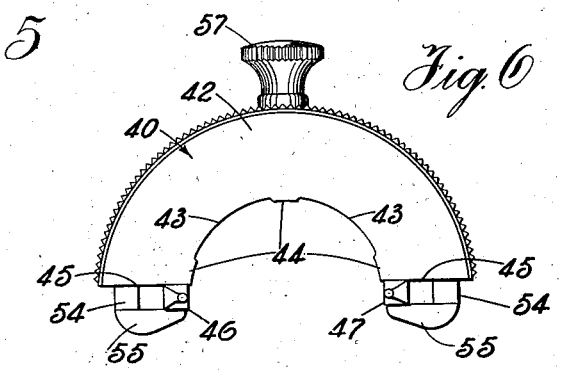
Figure 6 is an end elevational view of the calipers shown in Figure 5.
Figure 7:
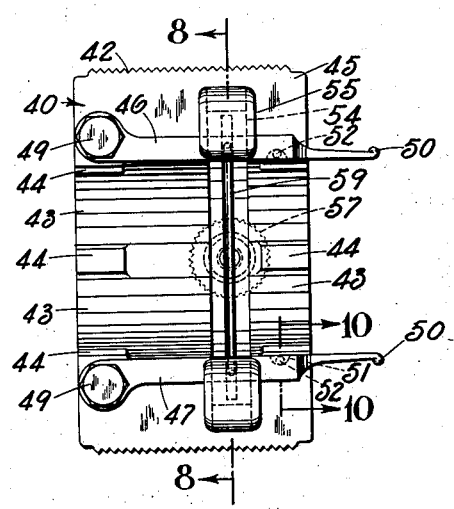
Figure 7 is a bottom plan view of the calipers shown in Figure 5.

As seen more clearly in Figure 3, a pair of arms 10 are pivotally secured at one end to the rear portion of the caliper 5 by means of stud pivots 12. At their forward ends the arms project beyond the forward end of the caliper body and are provided with tip portions 13 which are adapted to engage the surface of the bore 8. It will be noted that the caliper body 5 is of generally semicylindrical form having coplanar side portions at the opposite edges of the arcuate recess 14 for receiving the arms 10, these arms being so mounted that they are movable toward and away from each other in a common plane which passes through the axis of the cutter bar 7.

Adjacent the upper end of the calipers the body portion 5 is provided with oppositely disposed laterally offset bosses 15 adapted to receive pin members 16 extending through and having a headed portion 17 which engages about the defining surface of the arcuately formed slots 18 provided in lateral extensions 19 on each of the arms 10. The upper ends of the pins 16 are threaded as indicated at 20 and are adapted to extend into the threaded recesses in the cap nuts 22 whereby the pins are supported against longitudinal displacement with respect to the caliper 5 which may be drawn up tightly by tightening of the cap nuts 22 to provide a frictional clamp for preventing swinging movement of the arms 10 about the pivots 12. Each of the pins 16 is provided with a longitudinal slot 23 in the same portion thereof in which is engaged the projecting end 24 of a guide pin 25 for preventing rotation of the pins 16 and thus insuring that the cap nuts 22 will draw the pins forwardly to clamp the arms in fixed position. The arms 10 are normally urged outwardly away from each other about the pivots 12 by means of spring members 27 which at one end are secured to the flat surfaces of the caliper body by means of pins 28 and at their opposite ends projecting into recesses 29 formed in the arms 10 adjacent the extensions 19.

It will be noted that the recess 14 in the caliper body is provided with pad portions 30 to locate the body portion in alinement with the axis of the cutter bar 7 regardless of its angle portion thereon. In operation the arms 10 are clamped in their innermost position as determined by the length of the slot 18 against the pressure of the springs 27. The calipers placed on the cutter bar ends move axially toward the recess 8 in the work piece 9 until the projecting ends of the tips 13 of the arms are disposed a sufficient distance within the recess to engage the same beyond the point at which run-out would occur.

The cap nuts 22 are then loosened which removes the frictional clamping engagement of the heads of pins 16 on the arms 10. As a result the springs 27 move the arms outwardly and away from each other in a common plane which passes through the center or axis of the cutter bar and consequently through the center of the recess 8. The arms thus assume the position shown in Figure 3 and contact with substantially uniform pressure against opposite points on the surface of the recess 8 disposed diametrically opposite. Thus a measure of the true internal diameter of the recess is provided by the distance between the tip ends 13 of the arms 10.

With the caliper in this position the nuts 22 are again tightened thereby securely locking the arms against rotation or movement and the caliper is then removed from the cutter bar. Any suitable means may then be employed for indicating the distance of the tip ends of the arms to insure a true measurement of the diameter of the recess 8.

It will be apparent that with the use of a caliper of this type there is no necessity for removing the cutter bar from the work piece and the arms are of such design that when the caliper is properly located at a position in the cutter bar, the arms will project within the recess a sufficient distance to insure a true measure of the diameter thereof and eliminate any possibility of including the run-out in the measurement.

The form of the invention shown in Figures 6 to 10 has several points of advantage over the form of the invention shown in Figures 1 to 4. It will be apparent that with the modified form, the operation and measurement can all be obtained by the use of only one hand and that the spring pressure for forcing the arms against the surface to be measured will be equalized to insure the proper pressure engagement at each of the points of contact.

Considering this embodiment of the invention in further detail, the caliper body is indicated generally at 40 and comprises a narrow gripping portion 42 and an arcuate recess 43 adapted to receive the cutter bar in alinement therewith on the bearing pads 44. It will be noted that the recess 43 is slightly less than a semi-cylinder and consequently the normally extending surfaces 45 at each end of the recess are adapted to have the arms 46 and 47 carried thereon in such position as to be movable in a common plane passing through the center of curvature of the recess 43 and hence through the center or axis of the cutter bar portion on which the caliper is to be mounted.

Figure 9:
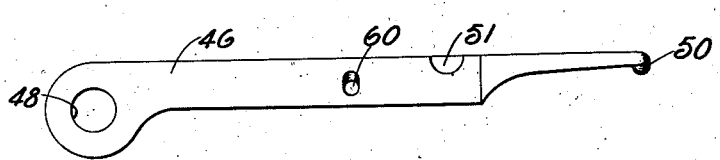
Figure 9 is an enlarged detailed view of one of the caliper arms.

The arms 46 and 47, as shown in more detail in Figure 9, each have an enlarged portion at one end which is suitably apertured as indicated at 48 to receive the stud pivot members 49 by which the arms are secured for pivotal movement to the surface 45. At their opposite end the arms 46 and 47 are reduced in cross section and extend forwardly a sufficient distance beyond the forward edge of the caliper body 40 to insure reaching within the recess to be measured a distance such as to avoid run-out. The projecting ends of the arms have tipped portions which are rounded to provide a point of contact indicated at 50. Adjacent the forward portion of each of the arms 46 and 47 there is provided a semi-circular notch or recess 51 in the inner face of each of the arms which recess is adapted to engage the pins 52 carried by the body portion 40 of the caliper to thereby limit inward movement of the arms beyond the position determined by the pins 52.

Figure 8:
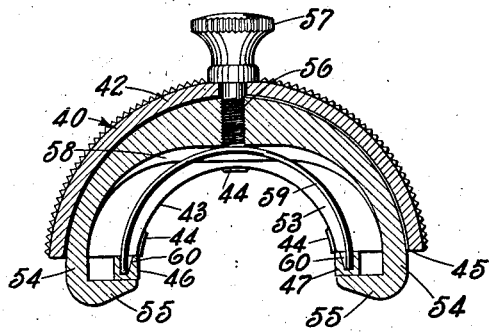
Figure 8 is a sectional view taken substantially on the line 8—8 of Figure 7.
Figure 10:
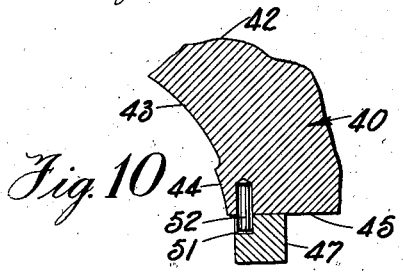
Figure 10 is an enlarged sectional view taken substantially on line 10—10 of Figure 7, showing the stop means for limiting inward movement of the caliper arms.

The body of the caliper intermediate its ends is provided with an arcuate recess indicated at 53 in Figure 8 in which is disposed a generally U-shaped bracket or clamp 54. This member is provided with inturned ends 55 adapted to extend across the outer face of the arms 46 and 47. The member 54 is provided with a threaded portion at its center adapted to be engaged by the threaded portion 56 of a bolt 57 whereby tightening of the bolt 57 will raise the member 54 within the recess to produce clamping engagement between the ends 55 and the arms 46 and 47. Thus the member 54 is capable of positively clamping the arms 46 and 47 in any desired position by tightening of the bolt 57.

On the internal surface of the member 54 there is provided a notch 58 in which is located the center portion of an arched spring member 59. The ends of the spring member 59 are engaged in suitable pockets or recesses 60 formed in the arms 46 and 47 and the spring normally tends to spread the arms 46 and 47 apart. The positioning of the central portion in the notch 58 prevents locking or displacement of the spring which insures that it will be supported in floating position for insuring movement of the arms 46 outwardly whenever the member 54 is released from clamping engagement.

It will be apparent that the operation of this type of caliper is similar to that previously described with the exception that only a single bolt or cap nut need be operated to release the arms from innermost clamped position for moving into engagement with the defining diametrically opposite surfaces of a recess to be measured. Thus the mechanism is capable of being readily operated with only one hand and the measurement can be facilitated and sped up appreciably over that employed with a caliper of the type shown in Figure 1.

It is believed obvious that the present type of caliper as disclosed in this application has numerous advantages so far as simplicity of design and ease of operation is concerned. In addition, it is possible to obtain the measurements of bores without requiring the removal of the boring bar and without any necessity of considering the run-out adjacent the end of the bore since the construction permits the insertion of the projecting ends of the arms a sufficient distance to avoid this run-out. By placing the two arms in such position that they are movable in a common plane which passes through the axis of the cutter bar it will be apparent that the projecting ends thereof will always engage diametrically opposite points in the bore and consequently will provide for a true measurement of the diameter of the bore.

I do not intend to be limited to the specific details of construction herein shown and described inasmuch as I am aware that various changes in structure and design of parts can be made without departing from the underlying principles of my invention. I therefore intend to limit my invention only as defined by the scope and spirit of the appended claims.

I claim:

1. A caliper comprising a generally arcuate body member having a pair of arms projecting axially therefrom and pivotally supported thereon, spring means carried by said body member and engaging said arms intermediate their ends normally tending to spread said arms, and friction clamping means carried by said body member for locking said arms in position against said body member.

2. A caliper comprising a body member having a substantially semi-cylindrical recess therein for supporting said member on a cutter bar, arms pivotally mounted on said member at opposite sides of said recess and projecting axially beyond one end of said body member, spring means carried by said body for normally urging said arms apart, and means frictionally clamping said arms in position.

3. A caliper comprising a body member having a substantially semi-cylindrical recess therein adapted to support said member for axial movement along a cutter bar, arms pivotally mounted on opposite sides of said recess on a diameter of the cylindrical curvature of said recess, each of said arms having a projecting tip portion beyond one end of said member, spring means carried by said body member and engaging said arms intermediate said pivotal mounting and said tip ends.

4. A caliper for measuring the diameter of a bore made by a cutter bar without removing the bar comprising a body member having a substantially semi-cylindrical recess therein of a radius corresponding to that of said bar and axially slidable along said bar, a pair of projecting arms carried by said member and disposed in diametrically opposed relation with respect to said bar, said arms being normally urged outwardly to engage against diametrically opposed points in said bore when inserted therein, and means for clamping said arms in position for ascertaining the diameter of said bore when said member is moved to withdraw said arms therefrom.

5. A caliper comprising a body member, a pair of diametrically opposed pivoted arms carried thereon having a substantially semi-cylindrical recess therebetween, the ends of said arms projecting axially beyond said recess, spring means normally urging the ends of said arms radially outwardly away from the center of curvature of said recess, and means frictionally engaging said arms for clamping the same against outward movement.

6. A caliper comprising an arcuate body member adapted to be supported on the lateral surface of a cylindrical bar, a pair of arms pivotally mounted for swinging movement on said member in a common plane passing through the center of said bar, means limiting the range of swinging movement of said arms, and means clamping said arms in any desired intermediate position.

7. A caliper comprising an arcuate body member adapted for support and axial sliding movement on a cylindrical member, a pair of arms pivotally mounted at one end on the body member for swinging movement toward and away from each other in a common plane passing through center of said cylindrical member, means limiting the swinging movement of said arms, means normally urging said arms outwardly away from each other, and means for clamping said arms in any intermediate position.

8. The caliper of claim 7 wherein said means normally urging said arms apart comprises an arched spring member supported centrally in said body member and having its ends engaging said arms.

9. A bore-measuring caliper comprising an arcuate body member having a pair of arms pivoted thereon for swinging movement in a common plane passing through the center of curvature of said member, spring means normally tending to spread said arms apart, and a U-shaped clamp carried by said member and having means at the ends thereof engaging said arms for holding them against movement when said caliper is withdrawn from said bore.

10. In a bore-measuring caliper, a body member having a pair of arms pivotally mounted thereon and swinging toward and away from each other in a common plane passing through the axis of said bore, stop means on said body member for limiting swinging movement of said arms and including a floating member having means for clamping said arms in fixed position while in the bore being measured.

11. An arm for a bore-measuring caliper of the class described comprising a body portion having an enlarged apertured boss at one end, a reduced rounded tip at the opposite end, an outwardly flared depression in one surface of the arm intermediate its ends for receiving a spring, and a notched recess in one lateral edge of said arm for engaging a stop.

12. A caliper comprising a body portion having a substantially semi-cylindrical recess therein provided with spaced bearing pads, an arm on each side of said recess pivotally mounted adjacent one end of said body portion and projecting beyond the opposite end thereof, said arms being movable in a common plane passing through the center of curvature of said recess, a U-shaped spring supported in said body portion and having its ends engaging said arms for normally spreading the projecting ends thereof apart, and means carried by said body portion for clamping said arms against movement.

13. In combination, in a caliper for measuring a bore in a work piece with the cutter bar in position, a body portion having an arcuate recess fitting the surface of said bar and slidable thereon, a pair of pivots on said body portion adjacent the lateral edges of said recess, an arm mounted at one end on each of said pivots for swinging movement in a common plane passing through the axis of the bar, the opposite ends of said arms being reduced to form tips projecting beyond said body portion and insertable into the annular gap between said bar and said bore surface, means normally urging said arms apart to allow said tips to engage diametrically opposite points on the bore surface, and means on said body portion for releasing said arms for swinging movement and operable to clamp said arms in surface engaged position prior to removal of said tips from the bore.

14. In a caliper of the class described, a body of arcuate form having a pair of arms pivotally supported adjacent the lateral edges thereof for swinging movement in a common plane passing through the center of curvature of the internal surface of said body, stop means limiting inward movement of said arms, a U-shaped member supported in a recess in said body and movable relatively thereto for holding said arms against movement, and means operable to move said member into clamping position.

15. A bore-measuring caliper comprising a body portion having a substantially semi-cylindrical recess therein, a pair of arms pivoted at opposite sides of the recess to swing in a common plane passing through the center of curvature of the recess, spring means carried by said body portion for normally spreading said arms apart, and means including a screw clamp carried by said body portion for frictionally locking said arms against movement.

16. The caliper of claim 15 further characterized in the provision of stop means carried by said body portion for limiting pivotal movement of said arms.

17. A bore-measuring caliper comprising a body member having a substantially semi-cylindrical recess therein, said body member having coplanar surfaces extending in opposite directions from the ends of said recess, studs projecting through said surfaces and having arms pivotally mounted thereon for swinging movement in a common plane, spring means carried by said body member and engaging said arms for normally urging said arms apart, and a thumb screw carried in said body member and having means for clamping said arms against movement.

JAY D. McCLURE.